US011946298B2

(12) United States Patent
Brück

(10) Patent No.: US 11,946,298 B2
(45) Date of Patent: Apr. 2, 2024

(54) PUSH ROD LOCK FOR A SWITCHGEAR CABINET HOUSING, CORRESPONDING ARRANGEMENT, AND CORRESPONDING METHOD

(71) Applicant: RITTAL GMBH & CO. KG, Herborn (DE)

(72) Inventor: Daniel Brück, Sinn (DE)

(73) Assignee: RITTAL GMBH & CO. KG (DE)

( * ) Notice: Subject to any disclaimer, the term of this patent is extended or adjusted under 35 U.S.C. 154(b) by 1174 days.

(21) Appl. No.: 16/491,211

(22) PCT Filed: Feb. 15, 2018

(86) PCT No.: PCT/DE2018/100137

§ 371 (c)(1),
(2) Date: Sep. 5, 2019

(87) PCT Pub. No.: WO2018/177454

PCT Pub. Date: Oct. 4, 2018

(65) Prior Publication Data

US 2020/0032561 A1 Jan. 30, 2020

(30) Foreign Application Priority Data

Mar. 27, 2017 (DE) ..................... 10 2017 106 541.5
Jun. 26, 2017 (DE) ..................... 10 2017 114 094.8

(51) Int. Cl.
*E05C 9/02* (2006.01)
*E05B 9/08* (2006.01)
(Continued)

(52) U.S. Cl.
CPC .............. *E05C 9/028* (2013.01); *E05B 65/02* (2013.01); *E05C 9/006* (2013.01); *E05B 9/08* (2013.01);
(Continued)

(58) Field of Classification Search
CPC . E05C 9/028; E05C 9/006; E05C 9/08; E05C 9/185; E05C 9/22;
(Continued)

(56) References Cited

U.S. PATENT DOCUMENTS 1,515,611 A * 11/1924 O'Connor ............... E05B 35/00
70/216
3,296,842 A * 1/1967 Auerbach ................. G07F 9/10
70/371
(Continued)

FOREIGN PATENT DOCUMENTS

CN 101778984 A 7/2010
CN 201608428 U 10/2010
(Continued)

OTHER PUBLICATIONS

International Search Report (in English and German) and Written Opinion (in German) issued in PCT/DE2018/100137, dated May 2, 2018; ISA/EP.

*Primary Examiner* — Christine M Mills
*Assistant Examiner* — Faria F Ahmad
(74) *Attorney, Agent, or Firm* — Harness, Dickey & Pierce, P.L.C.

(57) ABSTRACT

The invention relates to a push rod lock for a switch cabinet housing, having a linearly adjustable push rod which is arranged on an inner side of a switch cabinet door and projects with a coupling piece from the inner side through the switch cabinet door, wherein a door lock plate which is mounted via an outer side of the switch cabinet door opposite the inner side is fixed to an actuating element which is coupled to the coupling piece via a mushroom pin connection on the switch cabinet door, wherein the push rod is adjustable between a second open position and a second closed position via the actuating element which is adjustable between a first open position and a first closed position,
(Continued)

wherein the mushroom pin connection is arranged at least in a release position in which the door lock plate is removable from the switch cabinet door at least when the push rod is arranged in the second closed position and the actuating element is arranged in an intermediate position between the first open position and the first closed position, and wherein the mushroom pin connection assumes a locking position when the actuating element is transferred from the intermediate position into the second closed position when the door lock plate is placed on the switch cabinet door in the release position. Additionally, a corresponding arrangement and a corresponding method are described.

14 Claims, 10 Drawing Sheets

(51) Int. Cl.

| | |
|---|---|
| ***E05B 65/02*** | (2006.01) |
| ***E05C 9/00*** | (2006.01) |
| ***E05C 9/12*** | (2006.01) |
| ***E05C 9/18*** | (2006.01) |
| ***E05C 9/22*** | (2006.01) |

(52) U.S. Cl.
CPC ................ *E05C 9/12* (2013.01); *E05C 9/185* (2013.01); *E05C 2009/1866* (2013.01); *E05C 9/22* (2013.01)

(58) Field of Classification Search
CPC .... E05C 2009/1866; E05C 9/082; E05C 9/10; E05C 9/12; E05B 65/02; E05B 9/08; Y10S 292/53; Y10S 292/54; Y10T 292/1099; Y10T 403/7015
USPC .......................................................... 403/353
See application file for complete search history.

(56) References Cited

U.S. PATENT DOCUMENTS

| | | | | | |
|---|---|---|---|---|---|
| 4,486,040 | A * | 12/1984 | Strangward | E05C 9/185 | 292/160 |
| 4,493,499 | A * | 1/1985 | Stenglein | E05C 9/02 | 292/DIG. 57 |
| 4,614,374 | A * | 9/1986 | Lannert | E05B 9/08 | 292/DIG. 68 |
| 4,838,054 | A * | 6/1989 | Weinerman | E05B 9/08 | 292/DIG. 31 |
| 4,850,209 | A * | 7/1989 | Weinerman | E05B 9/08 | 292/228 |
| 4,934,800 | A * | 6/1990 | Choi | E05B 53/00 | 292/DIG. 60 |
| 5,642,909 | A * | 7/1997 | Swan | E05C 9/1841 | 292/25 |
| 5,685,181 | A * | 11/1997 | Ramsauer | E05C 9/1858 | 70/462 |
| 6,485,067 | B1 | 11/2002 | Root | | |
| 6,497,437 | B1 | 12/2002 | Münch et al. | | |
| 6,564,598 | B2 * | 5/2003 | Segawa | E05B 13/103 | 70/213 |
| 6,679,088 | B2 | 1/2004 | Hartel et al. | | |
| 10,396,531 | B2 | 8/2019 | Reuter et al. | | |
| 11,162,279 | B1 * | 11/2021 | Wernlund | E05B 65/0858 | |
| 2002/0104341 | A1 | 8/2002 | Hartel et al. | | |
| 2010/0117384 | A1 * | 5/2010 | Cole | E05C 9/02 | 292/341.15 |
| 2011/0198867 | A1 * | 8/2011 | Hagemeyer | E05B 63/14 | 292/161 |
| 2013/0140833 | A1 * | 6/2013 | Hagemeyer | E05C 9/006 | 292/217 |
| 2014/0159387 | A1 * | 6/2014 | Hagemeyer | E05C 9/10 | 292/196 |
| 2016/0177603 | A1 * | 6/2016 | Sims | E05C 9/063 | 292/101 |
| 2017/0074011 | A1 * | 3/2017 | Chang | E05B 59/00 | |
| 2017/0081882 | A1 * | 3/2017 | Lin | E05B 65/1006 | |
| 2017/0122014 | A1 * | 5/2017 | Andrasfi | E05B 15/0205 | |
| 2018/0119462 | A1 * | 5/2018 | Hagemeyer | E05C 9/006 | |
| 2018/0375302 | A1 | 12/2018 | Reuter et al. | | |
| 2019/0214798 | A1 | 7/2019 | Schindler et al. | | |
| 2020/0032561 | A1 | 1/2020 | Brück | | |
| 2020/0332576 | A1 * | 10/2020 | De Barros | E05C 9/16 | |
| 2021/0102417 | A1 * | 4/2021 | Doring | E05C 9/02 | |
| 2021/0293062 | A1 * | 9/2021 | Doring | E05C 9/02 | |

FOREIGN PATENT DOCUMENTS

| | | | | | |
|---|---|---|---|---|---|
| CN | 103066518 | A | | 4/2013 | |
| DE | 29823344 | U1 | | 4/1999 | |
| DE | 19806690 | A1 | | 9/1999 | |
| DE | 10049637 | C2 | | 10/2002 | |
| DE | 202007014083 | U1 | | 2/2009 | |
| DE | 202011108844 | U1 | * | 5/2013 | E05C 9/004 |
| DE | 102013222691 | A1 | * | 5/2015 | E05B 63/0043 |
| DE | 102015206908 | A1 | * | 10/2016 | |
| EP | 1061208 | A2 | * | 12/2000 | E05B 9/08 |
| EP | 1598508 | A1 | * | 11/2005 | E05C 9/006 |
| EP | 1881140 | A1 | * | 1/2008 | E05C 9/006 |
| GB | 2241016 | A | * | 8/1991 | E05B 63/185 |
| GB | 2503954 | A | * | 1/2014 | E05C 9/006 |
| JP | 2001518586 | A | | 10/2001 | |
| JP | 200250216 | A | | 2/2002 | |
| JP | 2002509213 | A | | 3/2002 | |
| WO | WO-9842938 | A1 | * | 10/1998 | E05B 13/002 |
| WO | WO-9916994 | A1 | | 4/1999 | |
| WO | WO-9936654 | A1 | | 7/1999 | |
| WO | 2009049711 | A1 | | 4/2009 | |
| WO | WO-2016095897 | A1 | | 6/2016 | |
| WO | 2018177454 | A1 | | 10/2018 | |
| WO | WO-2018192603 | A1 | | 10/2018 | |
| WO | WO-2018192605 | A1 | | 10/2018 | |

* cited by examiner

PUSH ROD LOCK FOR A SWITCHGEAR CABINET HOUSING, CORRESPONDING ARRANGEMENT, AND CORRESPONDING METHOD

CROSS-REFERENCE TO RELATED APPLICATIONS

This application is a 371 U.S. National Phase of International Application No. PCT/DE2018/100137, filed on Feb. 15, 2018, which claims the benefit of German Application No. 10 2017 106 541.5, filed on Mar. 27, 2017 and German Application No. 10 2017 114 094.8, filed on Jun. 26, 2017. The entire disclosures of the above applications are incorporated herein by reference.

BACKGROUND

This section provides background information related to the present disclosure which is not necessarily prior art.

TECHNICAL FIELD

The invention relates to a push rod lock for a switch cabinet housing and a corresponding method. Such a push rod lock is known, for example, from WO 99/36654 A1 and WO 99/16994 A1. Similar push rod locks are also described in WO 2016/095897 A1 and DE 100 49 637 C2.

DISCUSSION

To mount the push rod lock, it is necessary to mount a door lock plate on the front of the switch cabinet door and mechanically couple an actuating element of the door lock plate to the push rod, the push rod being arranged on the inner side of the switch cabinet door and linearly adjustable in vertical direction. For the assembly of the door lock plate on the switch cabinet door, push rod locks known from the art require several screw connections between the door lock plate and the door or push rod lock, so that the assembly of the door lock plate is rather cumbersome. The snap-on handle known from the WO 2016/095897 A1 can be mounted quite conveniently on a switch cabinet door, but has a relatively complex snap-on mechanism to achieve this end.

SUMMARY

This section provides a general summary of the disclosure, and is not a comprehensive disclosure of its full scope or all of its features.

Based on the known state of the art, it is therefore the objective of the invention to further develop a push rod lock as described above such that it can be conveniently mounted on a switch cabinet door, on the one hand, and does not require complex mechanics, on the other, and is therefore low-maintenance and cost-effective to manufacture.

Accordingly, it is provided that the push rod lock has a linearly adjustable push rod arranged on an inner side of a switch cabinet door, which projects through the switch cabinet door from the inner side via a coupling piece. A door lock plate which is mounted via an outer side of the switch cabinet door opposite the inner side is fixed to the switch cabinet door via an actuating element coupled to the coupling piece by means of a mushroom pin connection. The push rod is adjustable between a second open position and a second closed position via the actuating element, which is adjustable between a first open position and a first closed position. The mushroom pin connection is arranged in a release position in which the door lock plate is removable from the switch cabinet door at least when the push rod is arranged in the second closed position and the actuating element is arranged in an intermediate position between the first open position and the first closed position. The mushroom pin connection assumes a locking position when the actuating element is transferred from the intermediate position to the second closed position when the door lock plate is placed on the switch cabinet door in the release position.

This provides that the push rod lock can be fixed on the outer side of the switch cabinet door in the course of a single actuation of the actuating element. For this purpose, the door lock plate can, for example, be arranged in a fully open position of the actuating element (first open position) or in an intermediate position between the first open position and the first closed position, while the push rod is, for example, in the second closed position. In other words, the door lock plate can be placed on the outer side of the switch cabinet door in an unsynchronized position between the actuating element and the push rod, whereby the coupling piece of the push rod is brought into engagement with the actuating element. For this purpose, the actuating element can, for example, have a form-fit receptacle for the coupling piece on its side facing the outer side of the switch cabinet door.

If now the door lock plate and the push rod are aligned in the unsynchronized position relative to each other and the coupling piece is in engagement with the actuating element, a mushroom pin connection, via which the door lock plate is to be fixed on the outer side of the switch cabinet door, can be arranged in a release position. In particular, mushroom pins which align with widened sections, for example of a keyhole in the outer side of the switch cabinet door, can be arranged on the side of the door lock plate facing the outer side of the switch cabinet door.

In the course of moving the actuating element from the first open position or the intermediate position to the second closed position, the door lock plate can be moved in vertical direction relative to the switch cabinet door so that the mushroom pin connection is transferred to a locking position. This can be achieved, for example, by preventing the push rod from moving further in the first closed position, i.e. beyond its closed position, e.g. because the push rod rests against a stop, so that the actuation of the actuating element is translated into a vertical displacement movement of the door lock plate with respect to the switch cabinet door, thus transferring the mushroom pin connection from the release position into the locking position, in which undercut mushroom pins engage behind the switch cabinet door.

The mushroom pin connection may have at least one keyhole-shaped opening through the switch cabinet door, in particular a door leaf plate thereof, and the door lock plate may have at least one mushroom pin projecting from a support side, via which the door lock plate is placed on the outer side. In order to prepare the push rod lock for the optional left or right stop, it may in particular be provided that the switch cabinet door has a correspondingly higher number of keyhole-shaped openings in comparison with the number of mushroom head pins on the support side of the door lock plate and, for example, the support side may have two mushroom head pins arranged diametrically to a form-fit receptacle for the coupling piece, while the switch cabinet door has two diametrically opposed keyhole-shaped openings or four keyhole-shaped openings arranged around the coupling piece at the corners of a rectangle. However, more than four keyhole-shaped openings can also be provided.

The geometry of the keyhole-shaped openings is not limited to any particular geometry. A keyhole-shaped opening is each characterized by a widened region which has a dimension which allows a mushroom pin to enter the keyhole with its mushroom head, while the keyhole further has a narrow portion which opens into the widened portion and which may be in the form of an elongated hole, the narrow portion having a width perpendicular to its longitudinal direction which is less than the clear width of the mushroom head of the mushroom pin. For example, the width of the elongated section may correspond to the diameter of a pin of the mushroom pin, at the end of which the mushroom head widened with respect to the pin is located. In order to permit both the left and right stop, the keyhole-shaped openings may, in particular, have a central widened portion for receiving the mushroom pin and a slot-like portion opposite each other in the vertical direction which opens each into the widened region.

The coupling piece can project through the switch cabinet door through an elongated hole extending in adjustment direction of the push rod, the coupling piece bearing against a longitudinal end of the elongated hole when the push rod is in the second closed position, so that the longitudinal end forms a stop for the coupling piece. This embodiment has the particular advantage that in the second closed position of the push rod, the door lock mechanism is not loaded during locking of the door lock plate on the outer side of the of the switch cabinet when displacing the door lock plate.

However, the invention shall also cover the kinematic reversal of the previously described coupling between the coupling piece and the adjusting element. For this purpose, for example, the adjusting element may have a coupling piece in the form of a bolt or the like, which extends through the switch cabinet door and into a form-fit receptacle on the inside of the push rod.

The mushroom pin connection may further comprise a locking bolt which is aligned with a recess in the switch cabinet door precisely when the mushroom pin connection assumes the locking position. In particular, it may be provided that the locking bolt in the locking position of the mushroom pin connection is received in a keyhole-shaped opening in the mushroom pin.

The locking bolt can be received in a bolt guide of the door lock plate, wherein the locking bolt has a spring-loaded bias relative to the bolt guide, or is held in the bolt guide by frictional engagement. The preload can be set so that the locking bolt automatically engages in the recess in the switch cabinet door as soon as the door lock plate has reached its end position opposite the switch cabinet door, i.e. the mushroom pin connection assumes its locking position.

In particular if the actuating member has a lever which can be pivoted or rotated relative to a base of the door lock plate, it may be provided that, in its release position, the locking bolt projects with an actuating pin from the base of the door lock plate over a side opposite the support side, wherein a free end of the actuating pin is displaced in the direction of said side when the lever is transferred from the first open position, in which it is pivoted or rotated relative to said side, to the first closed position, in which the lever rests on said side. It may be provided that the lever collides with the actuating pin of the locking bolt during pivoting or rotating on or into the base, so that the locking bolt is driven by the lever movement and is consequently driven into the recess, in particular the keyhole-shaped opening.

The door lock plate can be fixed on the outer side of the switch cabinet door via a support side of a base of the door lock plate, the support side having a circumferentially closed sealing, and at least one mushroom pin of the mushroom pin connection as well as an adjusting element, via which the actuating element is coupled to the coupling piece, being arranged in an area enclosed by the sealing. The adjusting element can have a form-fit receptacle via which the adjusting element can be coupled to the coupling piece of the push rod.

In particular, the sealing may be designed to have a coefficient of friction as low as possible compared to a surface coating of the switch cabinet door, e.g. an dip and/or powder coating, so that the sealing is a sliding bearing between the door lock plate and the switch cabinet door. This embodiment facilitates that the sealing, with which the door lock plate is guided over the outer side of the switch cabinet door, is not damaged during the relocation of the mushroom pin connection from the release position to the locking position.

A mushroom pin of the mushroom pin connection can be a threaded bolt screwed into a threaded receptacle in a support side of the door lock plate, wherein a mushroom head of the mushroom pin has a tool receptacle which is arranged to be accessible for a screwing tool via the inner side of the switch cabinet door. This embodiment can further facilitate the assembly and disassembly of the door lock plate in that only when the door lock plate has assumed its end position opposite the switch cabinet door, i.e. the mushroom pin connection is in its locking position, a seal for the IP protection class can be provided by an increase in the contact force between the door lock plate and the control cabinet door by further screwing of the threaded bolts into the threaded receptacles. Thus, the seal between the door lock plate and the switch cabinet door can also be preserved by not yet guiding the door lock plate over the switch cabinet door with the full contact force required for sealing between the door lock plate and the switch cabinet door, if the door lock plate is shifted in the vertical direction for locking the door lock plate on the switch cabinet door. According to another aspect, an arrangement comprising of a push rod lock of the type described above and a switch cabinet door is described, which has a door hole pattern via which the door lock plate can be fixed to the switch cabinet door, wherein the door hole pattern has a first and a second keyhole-shaped opening as well as an elongated hole, wherein the first keyhole-shaped opening is arranged below and in alignment with the elongated hole, and the second keyhole-shaped opening is arranged above the elongated hole and offset from the elongated hole, the door hole pattern preferably further comprising a cable passageway arranged below the second keyhole-shaped opening and laterally of the first keyhole-shaped opening, and wherein the door hole pattern is concealed by the door lock plate when secured to the switch cabinet door.

According to yet another aspect, the invention relates to a method for mounting a door lock plate on a switch cabinet door. The door lock plate, when mounted on the switch cabinet door, is fixed via a mushroom pin connection by vertically displacing the door lock plate relative to the switch cabinet door. The method is characterized by the following steps:

- positioning an actuating element of the door lock plate in a first open position or in a first intermediate position between the first open position and a closed position of the actuating element;
- positioning a push rod which is adjustable in vertical direction between a second open position and a second closed position at the inner side of the switch cabinet door, in the second closed position or in a second intermediate position between the second open position and a second closed position of the push rod;

placing the door lock plate with a vertical offset to its final mounting position on the switch cabinet door, wherein an adjusting element of an actuating element of the door lock plate is brought into engagement with a coupling piece of the push rod, and wherein furthermore at least one mushroom pin of the door lock plate is inserted into a keyhole-shaped opening of the switch cabinet door;

if the push rod is not arranged in the second closed position, transferring the actuator proportionately from the first open position or the first intermediate position in direction of the first closed position until the push rod is arranged in the second closed position; and when the push rod is arranged in the second closed position, transferring the actuating element into the first closed position and thereby displacing the door lock plate relative to the switch cabinet door until the door lock plate is arranged in an end position in which the mushroom pin connection assumes a locking position.

In the end position, a locking bolt can be inserted in the keyhole-shaped opening of the switch cabinet door or in a further recess in the switch cabinet door, so that the door lock plate is fixed in vertical direction relative to the switch cabinet door.

In the course of transferring the actuating element into the first closed position, wherein a lever of the actuating element is pivoted or rotated into a receptacle in the base of the door lock plate, an actuating pin, via which the locking bolt projects into the receptacle, can be moved out of the receptacle in the direction of the switch cabinet door. In particular, the lever can be swiveled in a plane perpendicular to the outer side of the switch cabinet door. Accordingly, the actuating pin and with it the locking bolt can also be moved vertically relative to the outer side of the switch cabinet door.

To unlock the door lock plate, the actuating element can first be brought into the first open position and a lever which can be swiveled and/or rotated relative to a base of the door lock plate can be swiveled or rotated out of a receptacle in which the lever is received in the first closed position, wherein in the following the locking bolt is pressed into a bolt guide of the door lock plate from the inner side of the switch cabinet door, wherein the locking bolt is disengaged from the keyhole-shaped opening or the further recess and projects into the receptacle with an actuating pin. If the door lock plate has an access control, for example a cylinder lock, it can thus also be avoided that the door lock plate is disassembled by unauthorized persons, since for disassembly of the door lock plate the lever must be swiveled out of the first closed position or rotated, for which the lever must be released, however, which is usually limited by a lock to authorized persons only, see for example the disclosure of WO 99/36654 A1.

It may also be provided that in the end position the mushroom pin is further screwed into the door lock and thus the door lock plate is sealingly fixed to the switch cabinet door under compression of a sealing between the switch cabinet door and the door lock plate.

A door lock plate in the sense of the present invention is not limited to any particular embodiment and in particular both lever locks (see WO 99/36654 A1) and toothed rack locks (see WO 99/16994 A1) are to be included by the invention.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure Further details of the invention are explained in the following figure description, where the respective figures show:

DETAILED DESCRIPTION

Example embodiments will now be described more fully with reference to the accompanying drawings.

Figure 1:
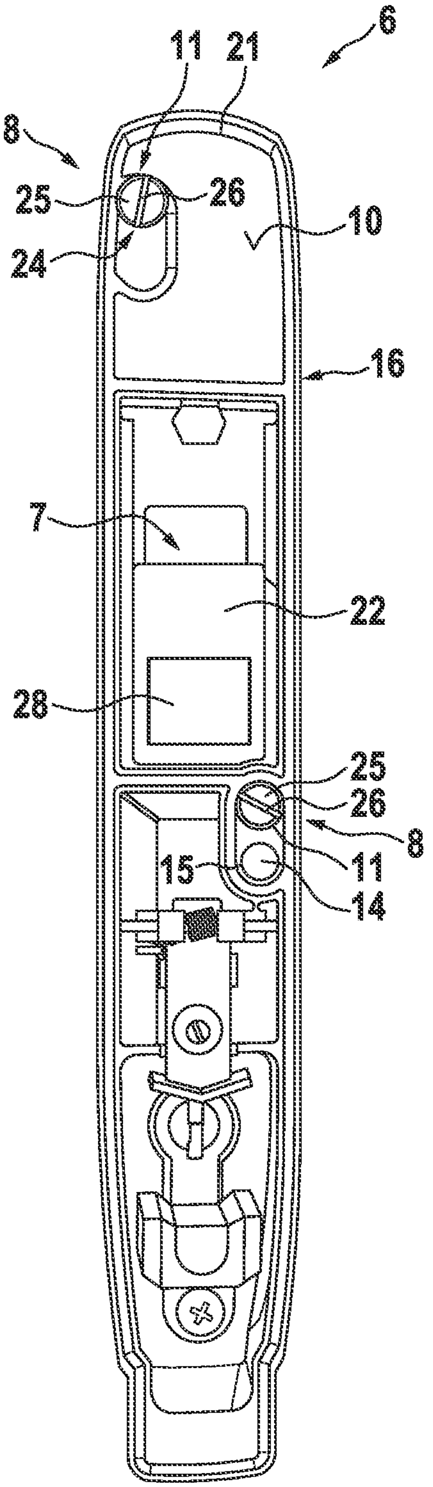
FIG. 1 shows a top view of the support side of a door lock plate according to an embodiment of the invention.

FIG. 1 depicts an exemplary embodiment of a door lock plate 6 showing the support side 10 of the door lock plate 6, via which the door lock plate 6 can be mounted on the outer side of a switch cabinet door (not shown). Two mushroom pins 11 extend perpendicularly to the support side 10, which have at their free end a mushroom head 25 with a tool holder 26, in this case a slot for a flat-head screwdriver, which is widened compared to the shaft of the mushroom pin 11. Furthermore, a circumferential sealing 21 is applied to the support side 10, via which the support side 10 rests on the outer side of a switch cabinet door. The sealing 21 can be an in-situ applied PU sealing which has a substance-bonded connection with the support side 10 and/or a low friction coefficient in order to facilitate the vertical displacement of the door lock plate 6 when locking it on the outer side of the switch cabinet door.

An actuating element 7 of the door lock plate 6 has, on the support side 10 facing the switch cabinet door, an adjusting element 22 with a form-fit adapter 28 via which the actuating element 7 can be brought into engagement with a coupling piece 4 of a push rod 3 of the push rod lock 1 (see FIG. 7), the form-fit consisting at least in the adjusting direction of the element 28.

One of the two mushroom pins 11 is provided with a locking bolt 14. The locking bolt 14 is guided in a bolt receiver 15 perpendicular to the support side 10. In an end position of the door lock plate in relation to the switch cabinet door, i.e. in an assembly position, the locking bolt 14 can engage in a recess in the switch cabinet door to fix the door lock plate 6 in its end position.

Figure 2:
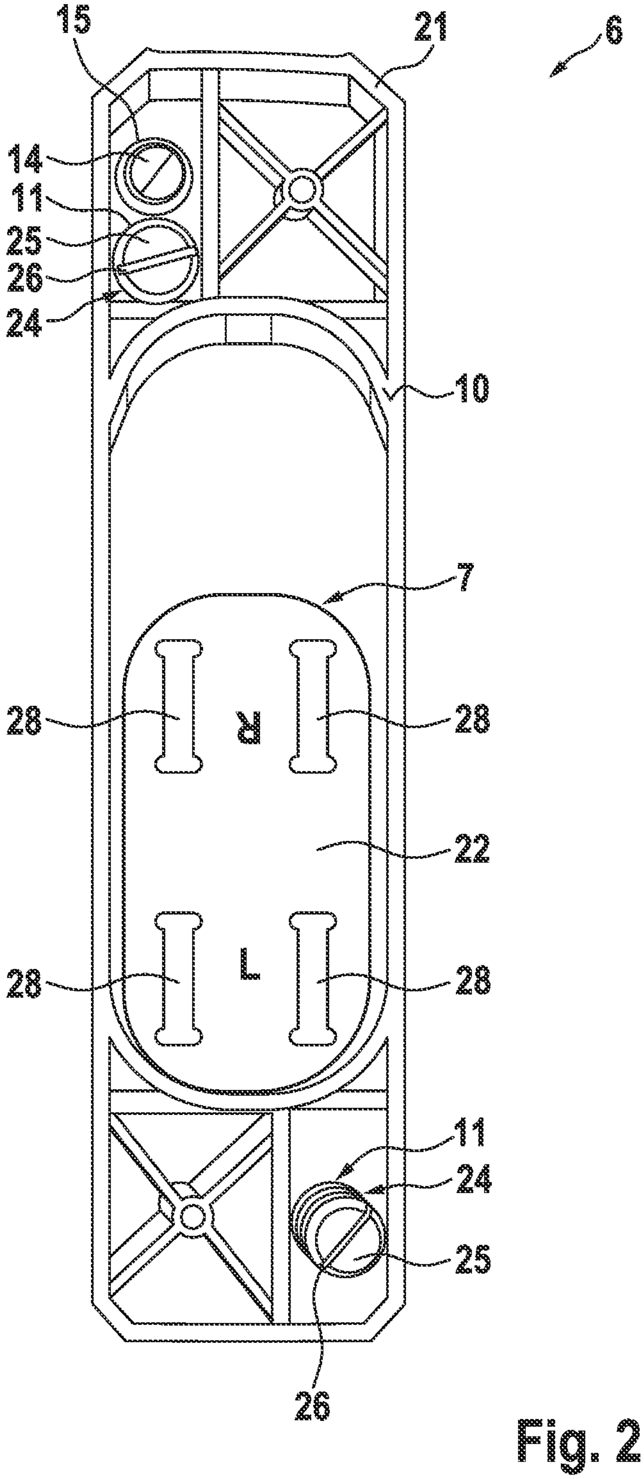
FIG. 2 shows a top view of the support side of a door lock plate according to another embodiment of the invention.

While the door lock plate shown in FIG. 1 is formed in the manner of a swiveling lever lock (see WO 99/36654 A1), the door lock plate shown in FIG. 2 is formed in the manner of a rack and pinion lock (see WO 99/16994 A1).

Analogous to the door lock plate shown in FIG. 1, the door lock plate shown in FIG. 2 also has a element 22, which has several form-fit receptacles 28 in order to be able to form the door lock plate 6 as an identical part both for the left and right stop of the switch cabinet door. In the case of the embodiment according to FIG. 1, the form-fit receptacle 28 is correspondingly wider to provide the stop variation in the direction perpendicular to the vertical direction, so that the form-fit receptacle 28 in the case of the embodiment according to FIG. 1 is designed for both the left stop and the right stop.

The actuating element 7 shown in FIG. 2 also has two diametrically opposed mushroom pins 11 with a shaft and a mushroom head 25. The bolt receptacle 24 is designed in the way of a threaded receptacle, i.e. the mushroom pin 11 is a threaded pin so that it can be pretensioned against the support side 10 of the door lock plate 6, e.g. to fix the door lock plate 6 in its end position on the switch cabinet door while compressing a sealing element 21 on the outer circumference of the door lock plate 6, or for adjustment purposes.

Figure 3:
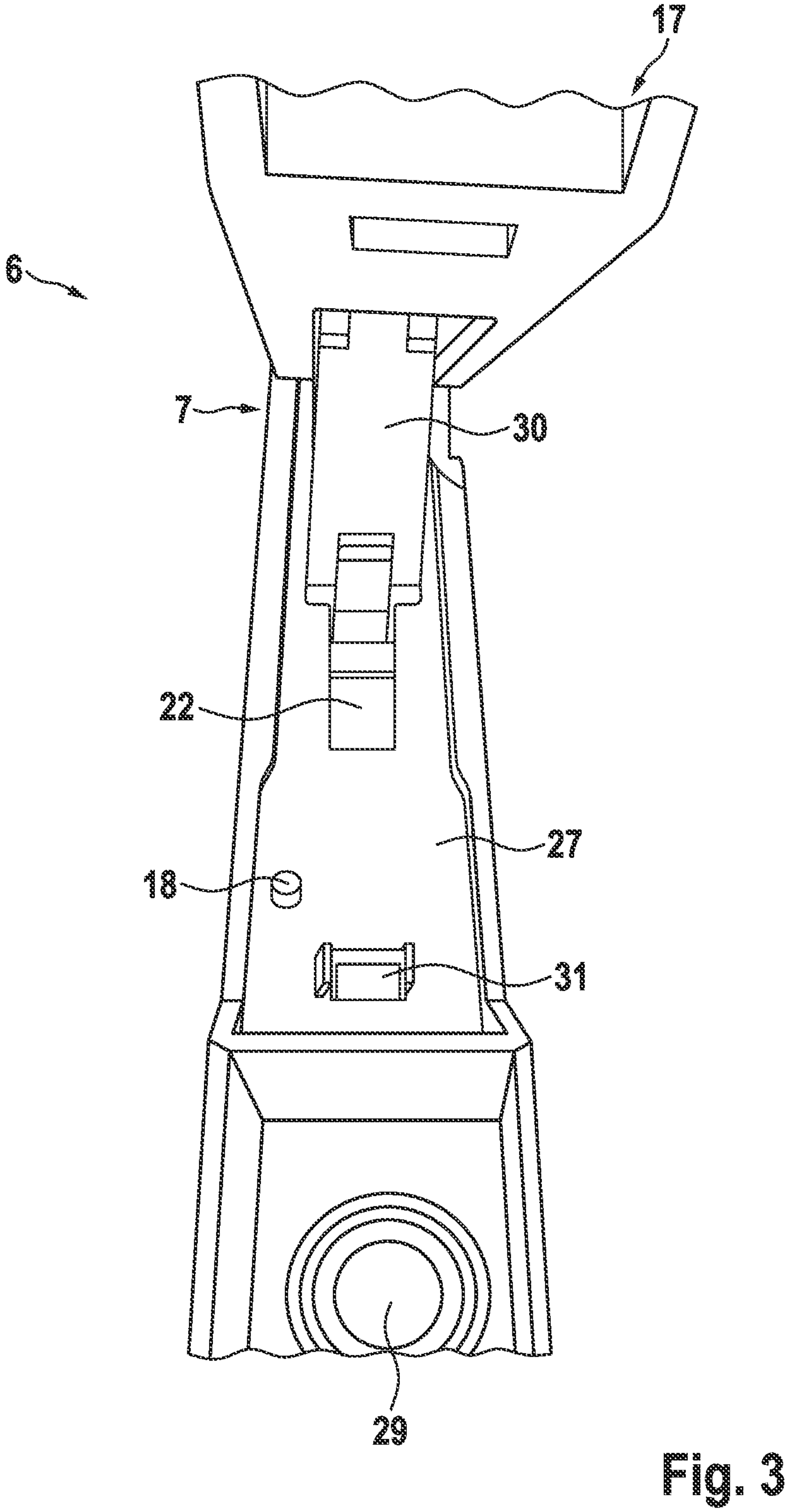
FIG. 3 shows a perspective view of a door lock plate according to an embodiment of the invention with opened swivel lever.

FIG. 3 shows a detailed view of a door lock plate 6 in the open position, i.e. with the lever 17 swiveled away from the receptacle 27, in the form of a swiveling lever. In this illustration a knee lever 30 of the actuating element 7 is visible, via which the lever 17 is operatively coupled with the adjusting element 22 (see FIG. 1). A locking bolt 14 (see FIG. 1) extends into the receptacle 27 on the side facing the receptacle 27 with an actuating pin 18 in the open position of the lever 17 shown in FIG. 3. The lever 17 is formed on the side facing the receptacle 27 in such a way that when the lever 17 swings completely into the receptacle 27, the free end of the actuating pin 18 hits the lever 17 and is moved by it further in the direction of the receptacle 27, so that the locking bolt 14 (see FIG. 1) is driven out of its bolt receptacle 15 in order to enter a receptacle in the switch cabinet door in the end position of the door lock plate 6 relative to the switch cabinet door and thus to fix the door lock plate 6 relative to the switch cabinet door.

The locking method is explained in detail with reference to FIGS. 4 to 7. Firstly, with reference to FIG. 7, a top view of the outer side 5 of a switch cabinet door 100 is shown, whereby the switch cabinet door 100 can be a sheet metal shaped part which, in particular at its vertical longitudinal edge opposite the door stop, has an L-edge, to which a push rod lock 1 with a push rod 3 guided on the inside of the door is assigned on the inner side of the switch cabinet door 100. The push rod 3 extends from the inner side 2 of the switch cabinet door 100 with a coupling piece 4 through the outer side 5 of the switch cabinet door 100 and projects beyond the outer side 5 with the coupling piece 4, so that when a door lock plate 6 is placed on the outer side 5, the door lock plate 6 can be coupled via its form-fit receptacle 28 in the adjusting element 22 with the actuating element 7 of the door lock plate 6.

The switch cabinet door 100 has a vertical elongated hole 12, along which the coupling piece 4 can be adjusted in vertical direction. Corresponding centering notches 37 in the coupling piece 4 and on a boundary side of the elongated hole 12 serve to pre-align the coupling piece 4 and thus the push rod lock 1 in order to facilitate the mounting of the door lock plate 6 on the switch cabinet door 100. As can be seen, the lower cabinet door notch 37 is closer to the lower elongated hole end 13 than the upper elongated hole end 13, and conversely the switch cabinet door upper notch 37 is closer to the upper elongated hole end 13 than the lower elongated hole end 13.

Figure 7:
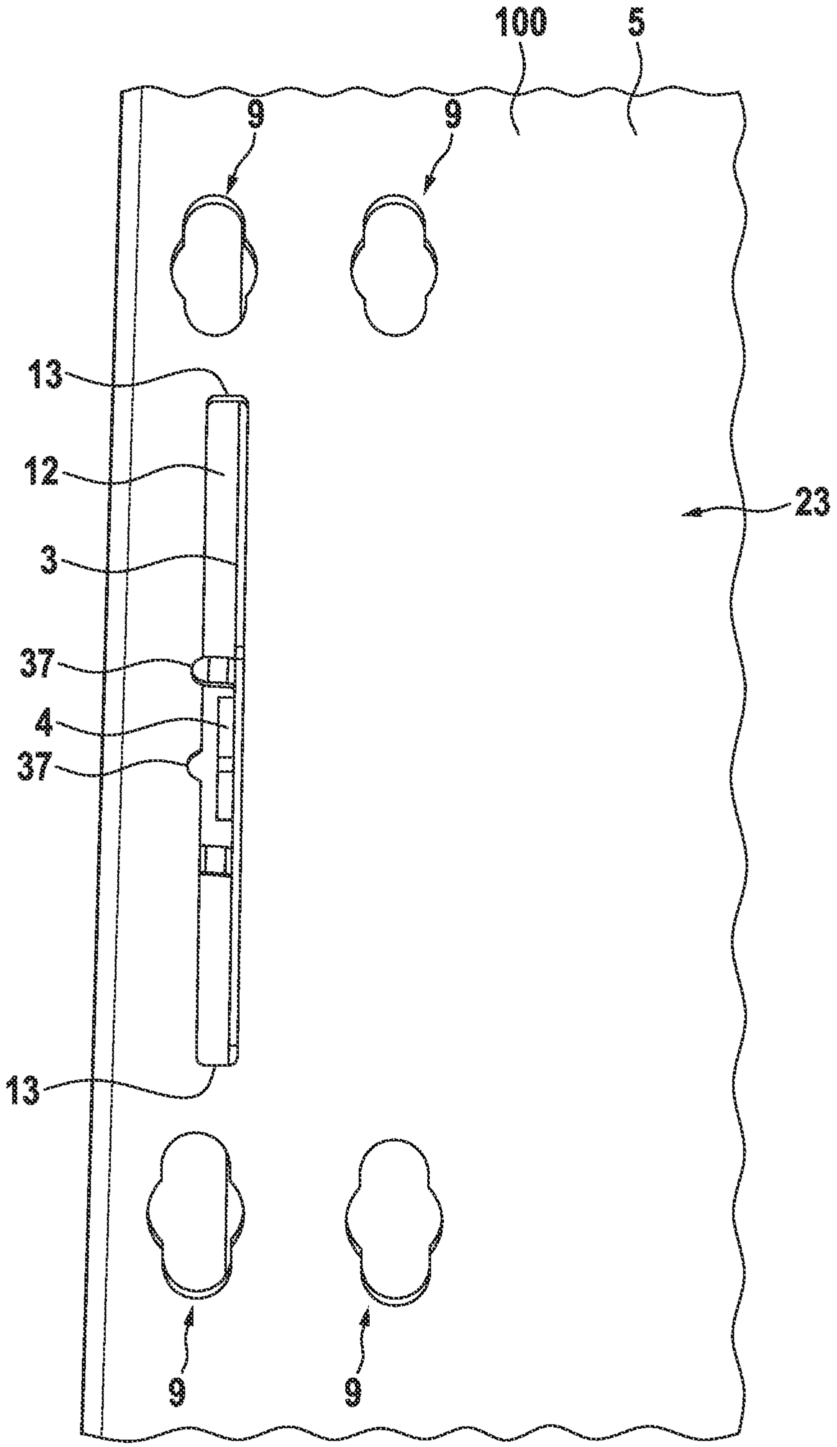
FIG. 7 shows a top view of the outer side of a switch cabinet door with the door lock plate disassembled.

Thus, in the case of the right stop of the door 100 shown in FIG. 7, the door lock plate 6 in its open position can be fitted to the outer side 5 of the door 100 by coupling the coupling piece 4 to the outer side 5, so that the door lock plate 6 with its mushroom pin passes through the widened areas of two diametrically opposite keyhole-shaped openings 9 through the switch cabinet door 100. In the following, the door lock plate 6 is transferred from its open position to the closed position, for example by swiveling the lever 17 shown in FIG. 3 from the shown open position into the receptacle 27. In this case, the coupling piece 4 meets the lower longitudinal end 13 of the elongated hole 12 as shown in FIG. 7 before the closed position of the door lock plate or the actuating element 7 of the door lock plate 6 is reached, i.e. before the lever 17 (see FIG. 3) is completely swiveled into the receptacle 27, so that further swiveling of the lever 17 leads to the door lock plate 6 being displaced upwards in the drawing plane, i.e. along the outer side 5 of the door 100, and thus the mushroom pin connection formed between the mushroom pins 11 (see FIGS. 1 and 2) and the keyhole-shaped opening 9 (see FIG. 7) is transferred into its connecting position, and the door lock plate 6 is fixed to the door 100.

Figure 4:
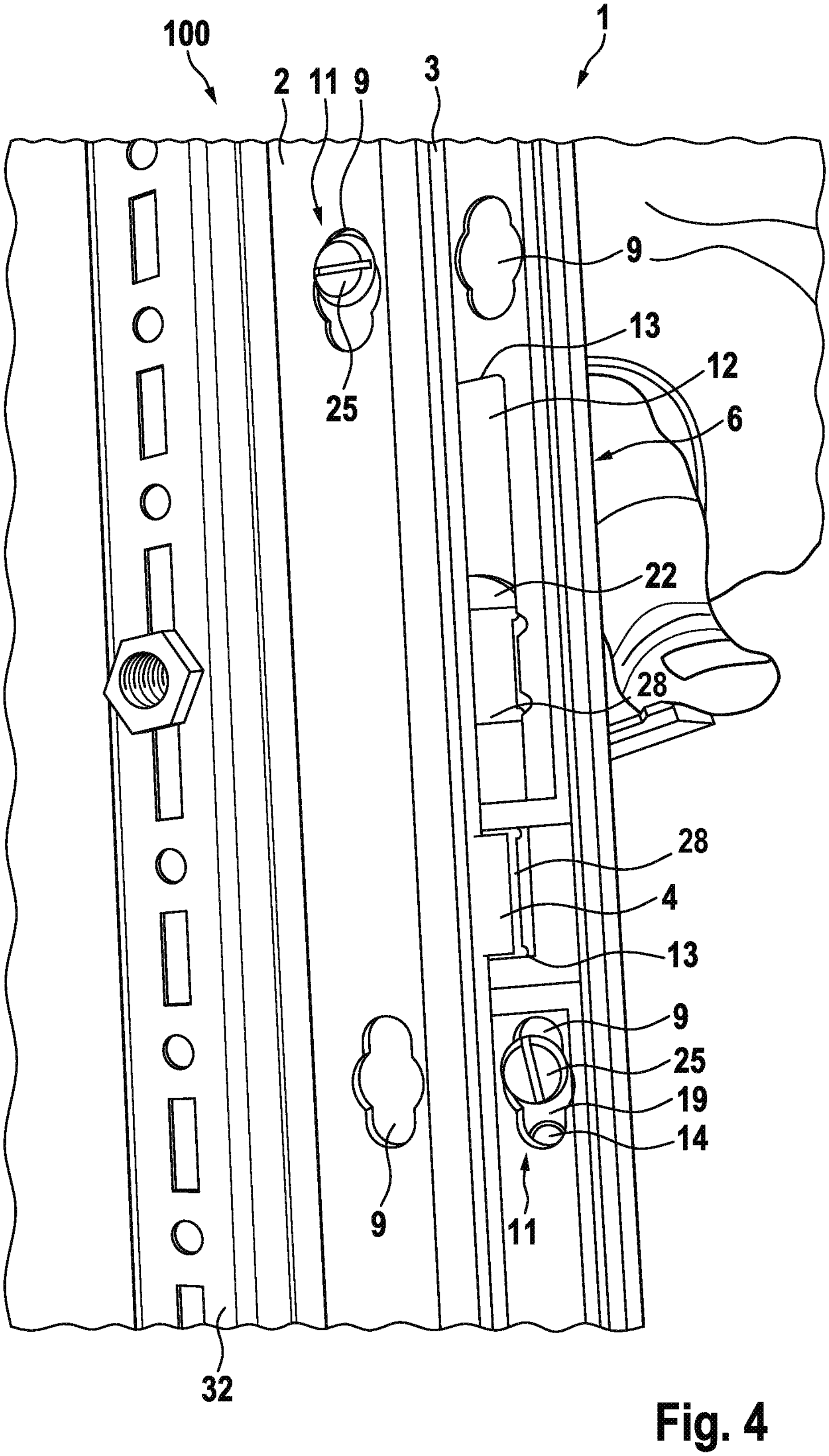
FIG. 4 shows a detailed view of the inner side of a switch cabinet door in the area of the door lock plate, wherein the mushroom pin connection is located between its locking position and its release position.
Figure 5:
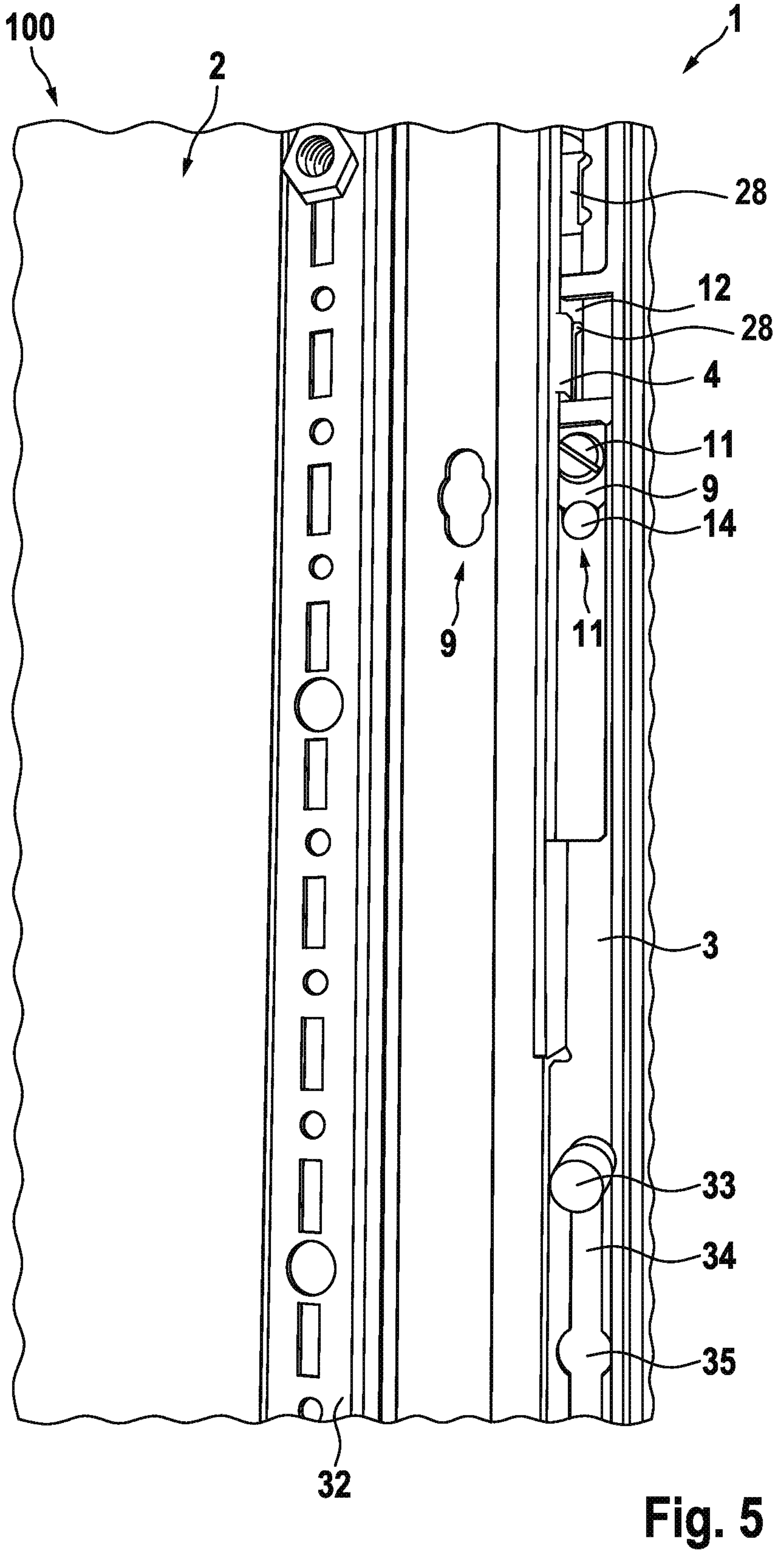
FIG. 5 shows a further detailed view of the inner side of a switch cabinet door, the mushroom pin connection being in the locking position.

FIG. 4 shows the position which the arrangement assumes when the coupling piece 4 meets the longitudinal end 13 of elongated hole 12, which acts as a stop, while the door lock plate 6 does not yet assume its end position by further displacement in the vertical direction, in which the mushroom heads 25 have completely emerged from the widened region of the keyhole-shaped openings 9 and the connecting pin 14 is completely aligned with the keyhole-shaped opening 9, so that the connecting pin 14 can be driven into the keyhole-shaped opening 9 for fixing the door lock plate 6 to the door. The above mentioned end position is shown in FIG. 5, where the locking bolt 14 is aligned with the keyhole-shaped opening 9 over its entire cross-section. A detailed view of this is shown in FIG. 6.

Figure 6:
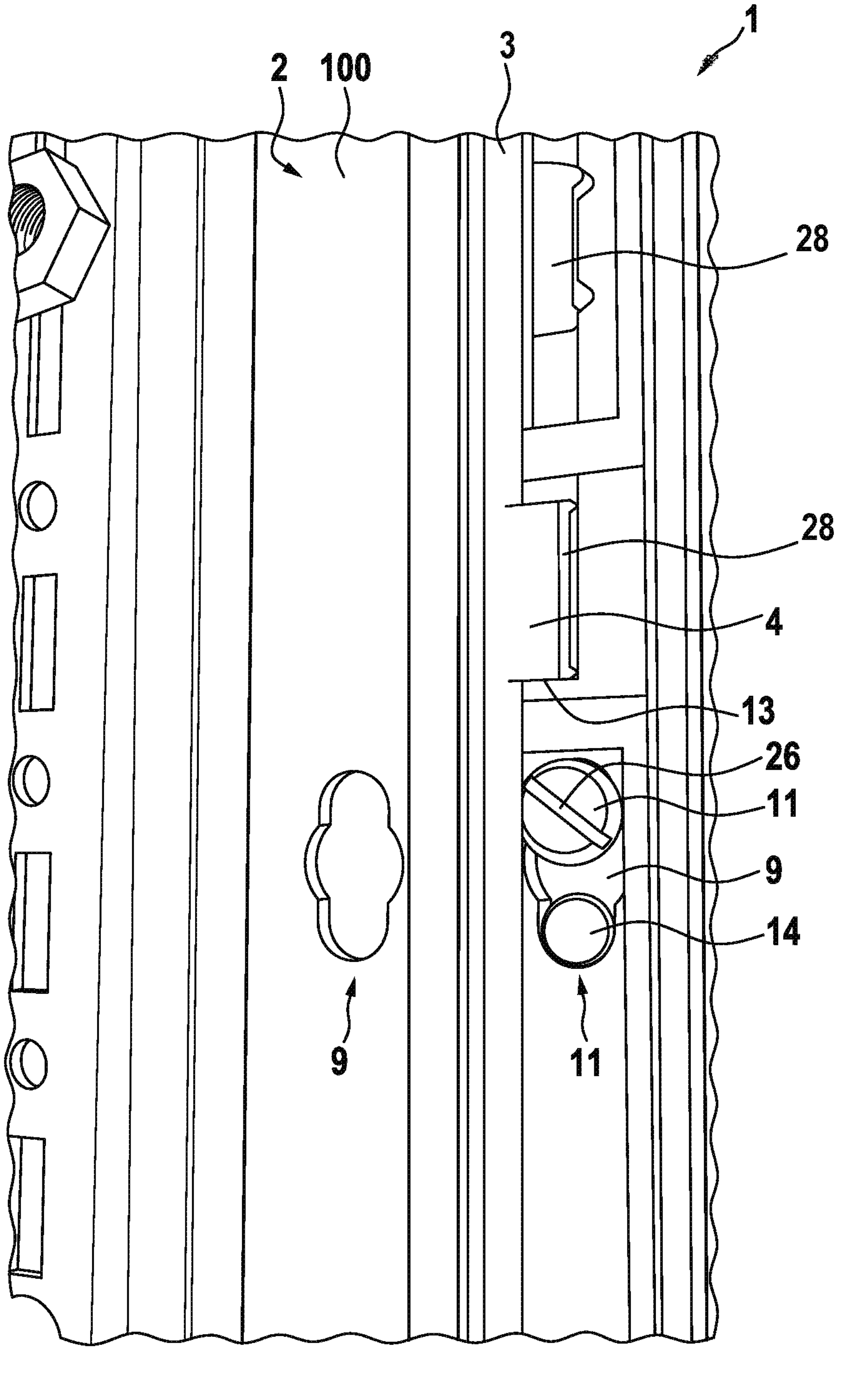
FIG. 6 shows an enlargement of the view according to FIG. 5 in the area of the mushroom pin connection.

In the end position shown in FIGS. 5 and 6, the mushroom pin 11 can be further screwed into the door lock plate 6 via the tool receptacle 26, so that the door lock plate is braced against the switch cabinet door, whereby a sealing arranged between the door lock plate 6 and the outer side of the door 100 is compressed, so that the required IP protection class is achieved.

Accordingly, for dismantling the door lock plate 6 from the switch cabinet door, in a first step the mushroom pin 11 can be unscrewed from the door lock plate 6 again, if necessary, in order to release the pretension between the switch cabinet door and the door lock plate. The locking bolt 14, which can be particularly accommodated in the bolt receptacle of the door lock plate by means of friction engagement, can then be pressed from the inner side 2 in the direction of the door lock plate 6, so that the locking pin 14 is disengaged from the keyhole-shaped opening 9. Then, the mushroom pin connection can be released by manually moving the door lock plate in the vertical direction relative to the switch cabinet door 100.

Figure 8:
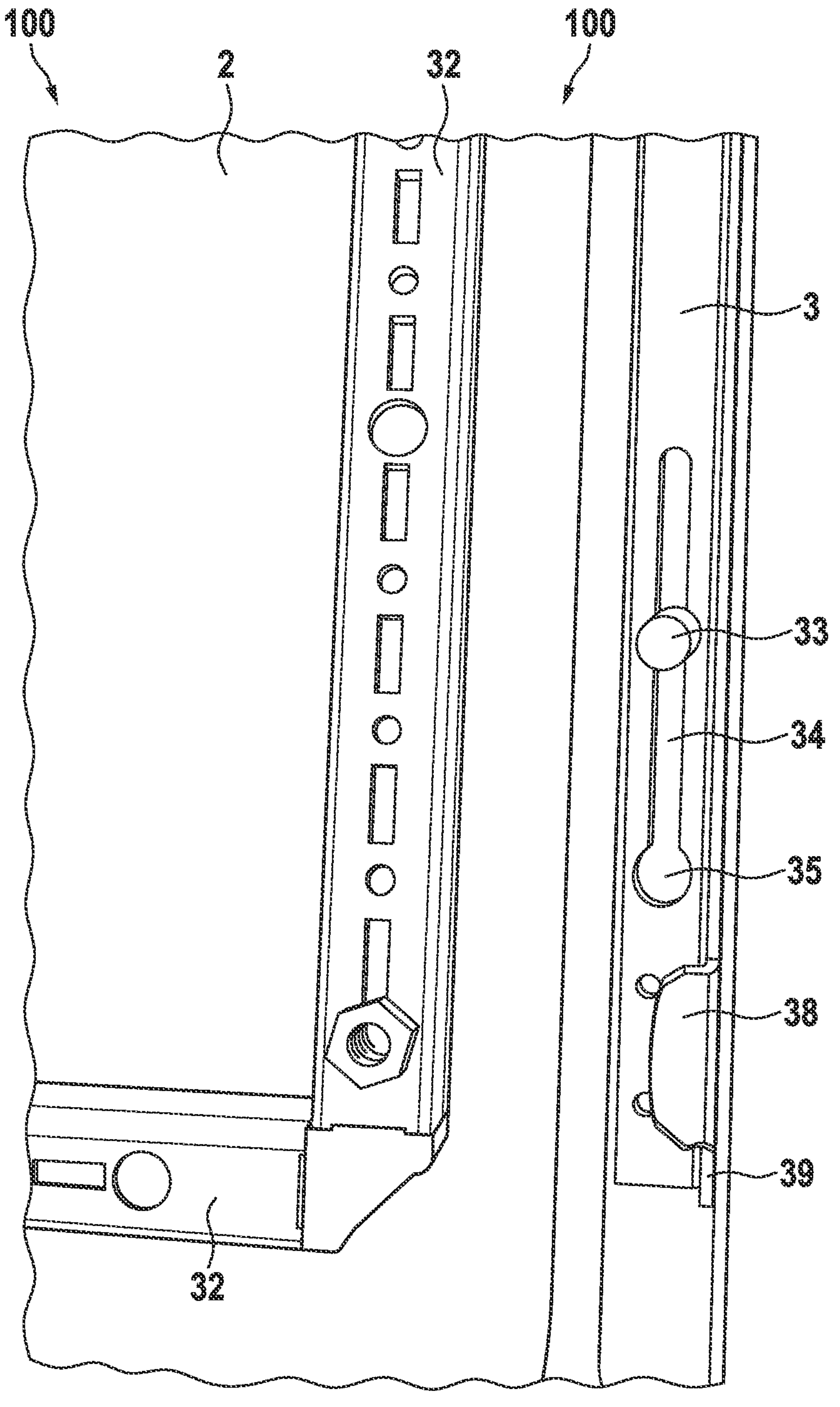
FIG. 8 shows a detailed view of the push rod lock on the inner side of a switch cabinet door.
Figure 9:
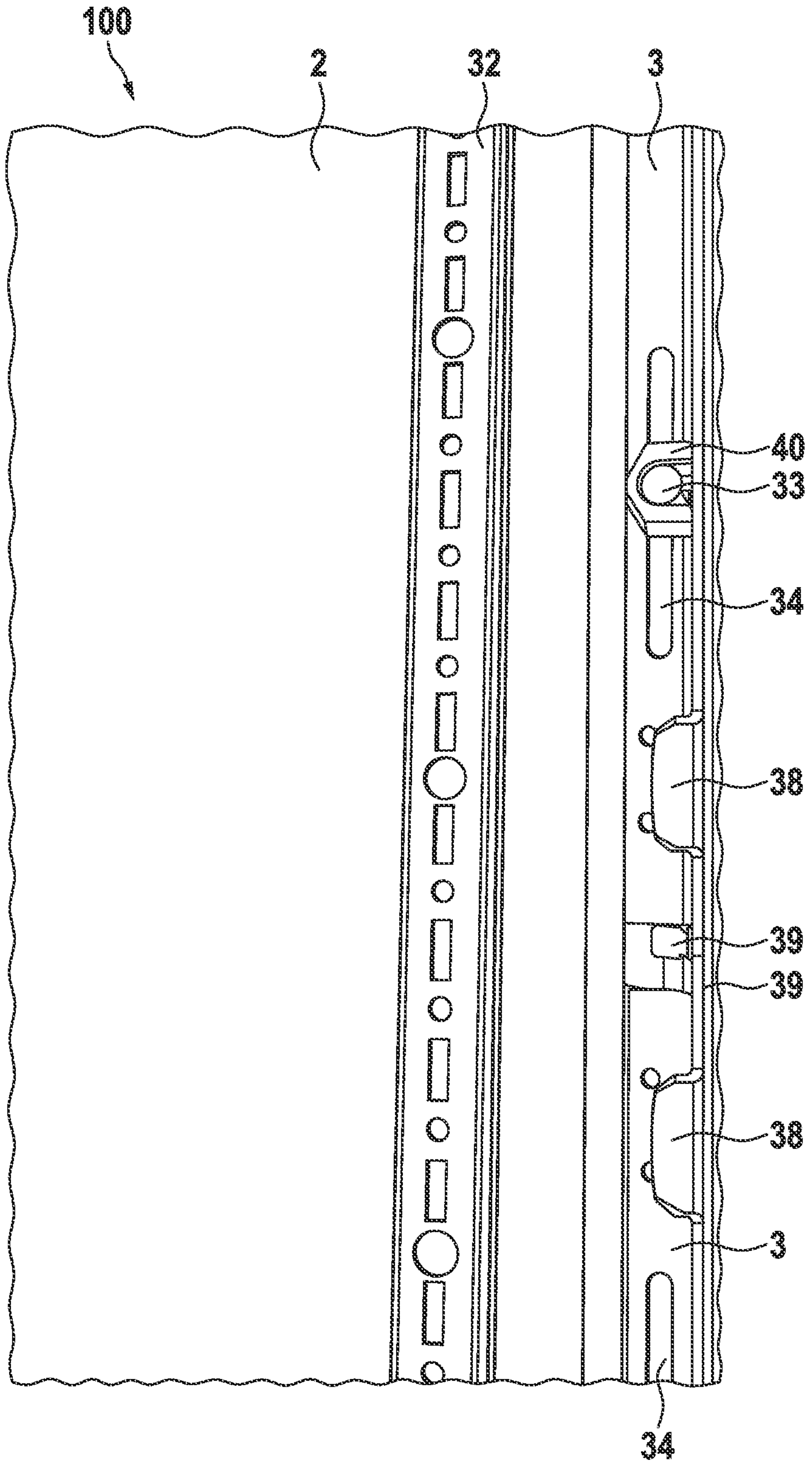
FIG. 9 shows a detailed view of the push rod lock on the inner side of the switch cabinet door according to yet another embodiment of the invention.

FIGS. 8 and 9 show in particular that the push rod 3 on the inner side 2 of the door 100 can be formed by several parts, whereby the individual segments of the push rod 3 are fixed to the door 100 in the same way as the door lock plate via a mushroom pin connection, but are vertically displaceable. For this purpose, guide grooves 34 of the push rod segments 3 have pin receptacles 35 over which the push rod segments 3 can be placed on an undercut door pin 33 which extends perpendicularly to the inner side 2 of the door 100. At their longitudinal ends, the push rod segments each have hooks 38, via which the push rods 3 can be engaged with corresponding counter-holders on the frame of the switch cabinet housing in order to hold the switch cabinet door in a closed position. Connectors 39 are assigned to each hook 38 to fix the various push rod segments 3 together. In order to avoid accidental disengagement of the segments from the switch cabinet door, the push rod segments can be fixed to door 100 using holders 40, which are snapped onto door pins 33. By cleverly combining push rod segments 3 of different lengths, the push rod 3 can be variably adapted to different switch cabinet door heights.

Figure 10:
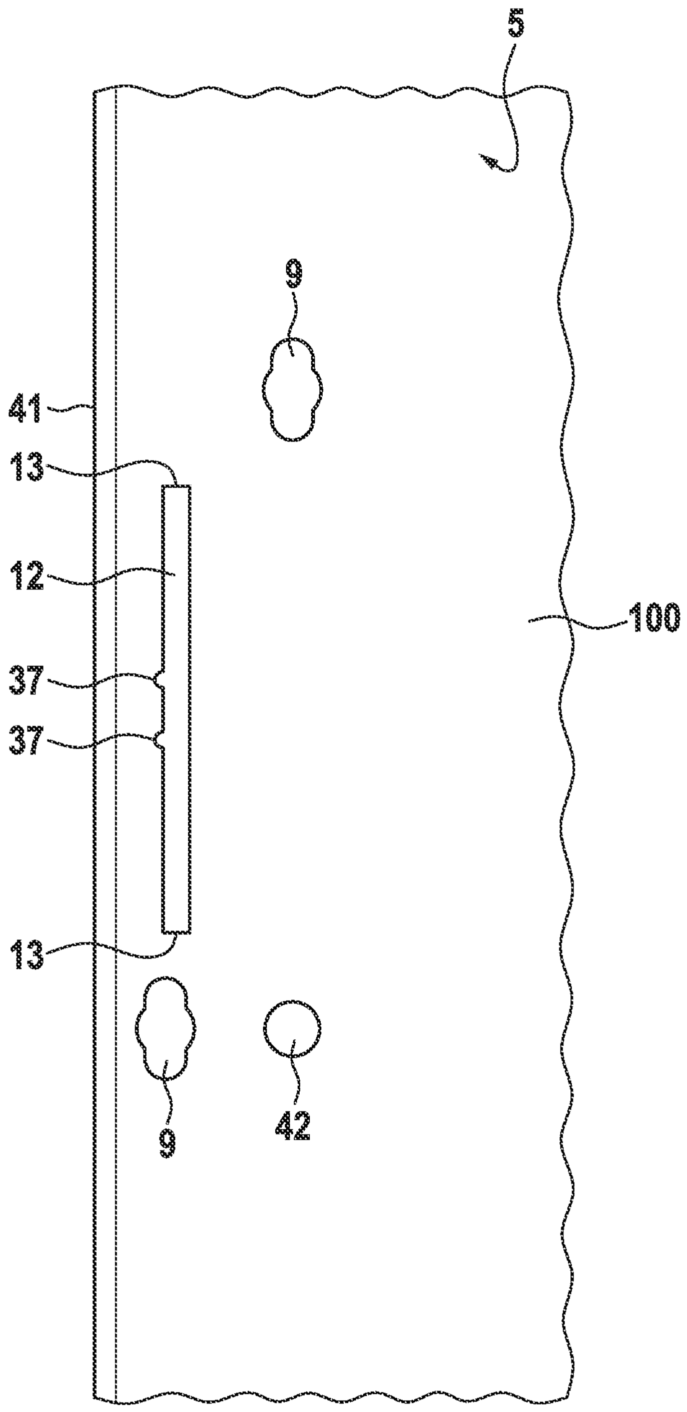
FIG. 10 shows a door hole pattern according to an embodiment of the invention.

In a variation of the door hole pattern shown in FIG. 7, FIG. 10 shows a door hole pattern associated with a folded edge 41 on the outer longitudinal edge of a door leaf of a switch cabinet door 100, via which a door lock plate (not shown) can be fixed on the side of the switch cabinet door 100 facing away from the hinge side. The door hole pattern has a first and a second keyhole-shaped opening 9 and an elongated hole 12, wherein the first keyhole-shaped opening 9 is arranged below the elongated hole 12 and aligned therewith and the second keyhole-shaped opening 9 is arranged above the elongated hole 12 and offset therewith. The door hole pattern further comprises a cable passageway 42 arranged below the second keyhole-shaped opening 9 and to the side of the first keyhole-shaped opening 9. The door hole pattern is completely covered by the door lock plate 6 when it is fixed to the switch cabinet door 100. The cable passageway 42 is optional and especially required for electronic door lock plates.

The features disclosed in the above description, drawings and claims may be essential to the realization of the invention, either individually or in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A push rod lock for a switch cabinet housing having a switch cabinet door comprising:

a linearly adjustable push rod arranged on an inner side of the switch cabinet door, the push rod having a coupling piece projecting through the switch cabinet door;

a door lock plate on an outer side of the switch cabinet door;

at least one mushroom pin connection projecting from the door lock plate;

an actuating element fixed to the door lock plate and coupled to the coupling piece, the actuating element moving the door lock plate from a first position where the at least one mushroom pin connection is configured in a first portion of a key opening in the switch cabinet door so that the door lock plate can be released from the switch cabinet door, the actuating element moving the door lock plate to a second position where the at least one mushroom pin connection is configured in a second portion of the key opening so that the door lock plate is locked to the switch cabinet door.

2. The push rod lock according to claim 1, in which the coupling piece projects through the switch cabinet door through an elongated hole extending in an adjustment direction of the push rod, the coupling piece bearing against a longitudinal end of the elongated hole when the push rod is in a closed position, so that the longitudinal end forms a stop for the coupling piece.

3. The push rod lock according to claim 1, in which the at least one mushroom pin connection further comprises a locking bolt which is aligned with a recess in the switch cabinet door precisely when the at least one mushroom pin connection assumes a locking position.

4. The push rod lock according to claim 3, in which the locking bolt is received in a bolt guide of the door lock plate, wherein the locking bolt has a spring-loaded bias relative to the bolt guide or is held in the bolt guide by frictional engagement.

5. The push rod lock according to claim 4, in which the actuating element is a lever which is pivotable and/or rotatable relative to a base of the door lock plate and the locking bolt projects from the base in a release position with an actuating pin over a side opposite a support side, wherein a free end of the actuating pin is displaced towards the side when the lever is transferred from the first open position in which it is pivoted or rotated relative to the side to the first closed position in which the lever rests on the side.

6. The push rod lock according to claim 1, in which the door lock plate is fixed via a support side of a base on the outer side of the switch cabinet door, the support side having a circumferentially closed sealing, and at least the mushroom pin connection and an adjusting element being arranged in a region enclosed by the circumferentially closed sealing.

7. The push rod lock according to claim 6, in which the circumferentially closed sealing is designed to have a friction coefficient as low as possible compared to a surface coating of the switch cabinet door, so that the circumferentially closed sealing is a sliding bearing between the door lock plate and the switch cabinet door.

8. The push rod lock according to claim 1, in which the at least one mushroom pin connection is a threaded bolt which is screwed into a threaded receptacle in a support side of the door lock plate, wherein a mushroom head of the at least one mushroom pin has a tool receptacle which is accessible for a screwing tool via the inner side of the switch cabinet door.

9. An arrangement comprising a push rod lock according to claim 1 wherein the switch cabinet door which has a door hole pattern via which the door lock plate can be fixed to the switch cabinet door, wherein the door hole pattern has a first key opening a second key opening and an elongated hole, the first key opening being arranged below the elongated hole and aligned therewith, and the second key opening being arranged above the elongated hole and offset with respect to the elongated hole, the door hole pattern being concealed by the door lock plate when secured to the switch cabinet door.

10. A method for mounting a door lock plate on a switch cabinet door, wherein the door lock plate, when mounted on the switch cabinet door, is fixed via a mushroom pin connection by vertically displacing the door lock plate relative to the switch cabinet door, the method comprising:

positioning an actuating element of the door lock plate in a first open position or in a first intermediate position between the first open position and a closed position of the actuating element;

positioning a push rod, which is adjustable in a vertical direction between a second open position and a second closed position at the inner side of the switch cabinet door, in the second closed position or a second intermediate position between the second open position and the second closed position of the push rod;

placing the door lock plate with a vertical offset to a final mounting position on the switch cabinet door, wherein an adjusting element of the actuating element of the door lock plate is brought into engagement with a coupling piece of the push rod, and wherein furthermore at least one mushroom pin of the door lock plate is inserted into a key opening of the switch cabinet door;

if the push rod is not arranged in the closed position, transferring the actuating element proportionately from the first open position or the first intermediate position in direction of the closed position until the push rod is arranged in the second closed position; and when the push rod is arranged in the closed position, transferring the actuating element into the closed position and thereby displacing the door lock plate relative to the switch cabinet door until the door lock plate is arranged in an end position in which the mushroom pin connection assumes a locking position.

11. The method according to claim 10, in which in and end position, a locking bolt is inserted in the key opening of the switch cabinet door or in a further recess in the switch cabinet door, so that the door lock plate is fixed in the vertical direction relative to the switch cabinet door.

12. The method according to claim 10, in which, in the course of transferring the actuating element into the closed position, wherein a lever of the actuating element is pivoted or rotated into a receptacle in a base of the door lock plate, an actuating pin, via which a locking bolt projects into the receptacle, is displaced out of the receptacle in the vertical direction of the switch cabinet door.

13. The method according to claim 10, in which, for unlocking the door lock plate, the actuating element is first brought into the first open position and, to this end, a lever which is pivotable or rotatable relative to a base of the door lock plate is pivoted or rotated out of a receptacle in which the lever is received in the closed position, wherein in the following a locking bolt is pressed into a bolt guide of the door lock plate from the inner side of the switch cabinet door, wherein the locking bolt is disengaged from the key opening or from a further recess and projects with an actuating pin into the receptacle.

14. The method according to claim 10, wherein in the end position the mushroom pin is further screwed into the door lock plate and thus the door lock plate is sealingly fixed to the switch cabinet door under compression of a sealing between the switch cabinet door and the door lock plate.

* * * * *